Patented Nov. 27, 1951

2,576,653

UNITED STATES PATENT OFFICE 2,576,653

REMOVAL OF IRON FROM A CRACKING CATALYST

Charles L. Thomas, Winnetka, Ill., assignor to Great Lakes Carbon Corporation, Morton Grove, Ill., a corporation of Delaware No Drawing. Application May 27, 1948, Serial No. 29,659

8 Claims. (Cl. 252—450)

This invention relates to a process for manufacturing catalysts from minerals having a planar or micaceous crystalline structure. More particularly it relates to the manufacture of catalytic agents of high activity and stability by treating siliceous minerals of the aluminosilicate and/or magnesium-silicate type, including the bentonitic clays, with chlorine or a chloride of carbon either before or after treating the clay with an acid to dissolve a portion of the aluminum and/or magnesium components therefrom.

The acid treating of clays to activate them is practiced commercially. It is known that clays, particularly montmorillonite, can be leached with mineral acids to enhance the catalytic activity thereof. Frequently such clays contain base-exchangeable metal cations including magnesium, calcium, iron, sodium, lithium, and potassium. The clays also contain other components which are not base-exchangeable; these include aluminum and/or magnesium and usually some iron. These cations and other components are removed, at least in part, during the activation. If the acid treatment is too severe, the activity of the treated material as a catalyst and for some other purposes is reduced and the material is said to be overtreated.

A catalyst made by the usual acid treatment of clays is susceptible after a short period of use, to reduction in catalytic activity, particularly in such processes as catalytic cracking of petroleum oil, reforming of gasoline, and the like conducted at elevated temperatures in the range of about 300–600° C. and requires intermittent regeneration or reactivation, at temperatures up to about 700° C., to burn off carbonaceous deposits formed during the processing step.

It has been found that such catalysts cannot be used for cracking oils having a relatively high sulfur content due to a sharp drop in activity from the beginning. The activity cannot be restored, as in the case of carbon deposition, by any known method. As a result the acid treated clay type catalyst has no practical utility for such oils. The more costly synthetic catalysts are used commercially.

The present invention provides a catalyst and method for preparing it, which exhibits long life and can be repeatedly regenerated even when used with high sulfur oils. The catalyst is designed for use in cracking such oils, the prior art having neither solved the problem nor suggested a solution.

In a broad embodiment, the invention comprises subjecting a natural bentonite type clay, either before or after acid treatment, to the action of chlorine or a low molecular weight volatile chloride of carbon at a temperature in the range of about 300–700° C. to remove iron.

It also comprises the process of converting hydrocarbons, particularly the cracking of hydrocarbon distillates to produce gasoline and gas.

In another broad embodiment, the invention comprises extracting a portion of the lattice metal atoms from a siliceous mineral having a planar structure, with a mineral acid such as hydrochloric, sulfuric, or nitric acid at a temperature above about 80° C. to dissolve from the mineral up to about 90% of the aluminum and/or magnesium present therein, then washing and drying the clay and passing the vapors of chlorine or a chloride of carbon over the clay at 300–700° C.

In another embodiment, the invention comprises depositing carbonaceous material on the clay particles either before or after acid treatment by passing hydrocarbon vapors over the clay at a temperature of about 450–700° C. and thereafter passing vapors of chlorine or chlorides of carbon over the clay at a temperature of about 300°–700° C. to remove iron, then burning off any carbonaceous deposit remaining by contact with an oxygen containing gas at a temperature below 700° C.

When the clay is treated in this manner before acid treatment, it is then subjected to the acid treatment as above referred to, washed and dried. When the acid treatment is carried out before deposition of the carbonaceous deposits the catalyst is ready for use after treating with chlorine or carbon chlorides and removal of the carbonaceous deposit as described.

Those minerals which may be treated according to this invention comprise silicates of aluminum and/or magnesium with or without other metals such as iron being present, and have a planar or sheet-like structure as shown by the X-ray diffraction pattern. Such structure is described and illustrated in the book "Atomic Structure of Minerals" by W. L. Bragg published in 1937 by the Cornell University Press of Ithaca, New York, on page 206.

Those minerals termed clays which may be treated according to this invention comprise naturally occurring materials generally with plastic properties, having an essential composition of very fine size grades; and an essential composition of crystalline fragments of minerals that are essentially hydrous aluminum and/or hydrous magnesium silicates; said materials having a plate-like or planar structure.

The basic unit of such minerals and clays consists of a lattice comprised of several layers or sheets. One layer comprises alumina and/or magnesia (in some instances iron may be present therewith) and consists of two planes of closely packed oxygen atoms and hydroxyl groups between which the aluminum and/or magnesium atoms are embedded in such a manner that each is regularly oriented with a group of six oxygen atoms and hydroxyl groups, the oxygen atoms of each plane thereof form a part of silica layers now to be described. The silica layer or sheet consists of tetrahedral silica groups. Each silicon atom has four oxygens attached to it to form a regular tetrahedron with silicon at its center and with three of the oxygens in a plane forming the base of the tetrahedron; the fourth oxygen atom being accounted for as above described. The silica layer consists of silicon atoms all lying in one plane and attached to oxygen as described and which lie in adjacent planes; further, the silicon atoms occupy the corner positions of a regular hexagonal pattern. Certain of these minerals or clay materials contain two such silica sheets, one above and one below the alumina and/or magnesia sheet. Thus the basic structure of bentonite, montmorillonite, pyrophyllite, etc. comprises two silica sheets with a central sheet between them containing aluminum, magnesium, or aluminum and magnesium. Talc is similar, except that magnesium occupies the central plane without aluminum being present. Thus, for pyrophyllite, the basic unit or lattice comprises two silica layers and an intermediate hydrous alumina layer.

The unit group of the lattice is arbitrarily considered as being made up in the ratio of, four silicon atoms in each silica sheet to four aluminum atoms in the alumina sheet, or in the case of magnesium alone with six atoms thereof, and it is thusly referred to herein.

The planar lattice comprises some multiple of this unit group. The mineral is made up of stacks of these planar lattices, one above the other with spaces between which are occupied by water, and in some cases by base-exchangeable ions. Pyrophyllite has no base-exchangeable ions. Montmorillonite, which contains some magnesium as well as aluminum in the central lattice plane or sheet, has base-exchange properties. Replacement of part of the metal atoms in the central lattice layer by another metal of lower valence, e. g., aluminum by magnesium, or merely removal of part of the metal atoms, sets up an ionic charge at the surface of the lattice, that is, in the space between the stacked lattices. The base-exchange properties of the minerals are related to this phenomenon.

Among the specific materials that may be treated according to the present invention are bentonite, montmorillonite, pyrophyllite, talc, the hydrous micas, illite, and the kaolin group including kaolinite. Kaolinite is an example of the planar structured minerals which have only one silica layer associated with an alumina layer and is, therefore, not exactly equivalent to those minerals having two silica sheets or layers comprising the lattice.

For purposes of simplification, the space between the lattices is referred to as the "interplanar" space, and the space or planes within a lattice, e. g., the metal layer between the silica layers of a given lattice structure, is referred to as the "intraplanar" layer.

When the acid treatment is carried out prior to the treatment of this invention, the mineral is ground to a fine state of subdivision, preferably 200 mesh or smaller, by known methods and is mixed with mineral acid to form a slurry. The proportions and the solution concentration of the acid employed may vary, and acid may be applied in more than one stage.

For example, in certain cases in which the mineral contains base-exchangeable metal cations, or impurities such as calcium, magnesium or iron carbonates, dilute acid may be used to remove part of these impurities by treating at temperatures in the range of about 10–40° C. This has no effect upon the essential crystalline lattice structure of the material and has no appreciable dissolving action on the intraplanar metals. It does remove interplanar base-exchangeable metal cations as well as certain other impurities. This treatment imparts no substantial catalytic activity to the mineral, although in some instances it will condition the mineral to produce a better activation by a subsequent treatment thereof.

The lattice metal ions which usually comprise aluminum and/or magnesium and may include some other elements such as iron in small percentages, are attacked by treatment with acid of about 5–15% concentration or more at a temperature of from about 60° C. to the boiling point of the mixture. In some cases stronger acid may be used, e. g. 40% or more. This step can be carried out in open vessels or vats or can be carried out in vessels equipped with a reflux condenser or can be carried out in closed vessels which can be placed under steam pressure. The exact type of apparatus and methods used will depend to some extent upon the mineral as well as the desired extent of removal of intraplanar metal atoms. The concentrations of acid may also affect the manner of treatment. Additional increments of acid can be added to the mineral-acid slurry from time to time as acid is consumed during the digestion. The amount used will vary depending upon how much of the intraplanar metal is to be dissolved out of the lattice.

The time for the acid treatment will vary, although 5–10 hours is sufficient for some minerals. Total times of 12–24 hours treatment are useful with the more refractory minerals. The time for individual stages, when two or more are used, varies from about one to six hours each.

As a general proposition, the extent of acid treatment can be divided into two arbitrary classes. On the one hand, the treatment is carried out only up to the maximum removal of components which can be had without appreciably changing the fundamental lattice structure as shown by the X-ray diffraction pattern to be an essential characteristic of the original crystalline mineral. In the case of minerals containing only aluminum in the intraplanar layer such as pyrophyllite, this means that about 30 to about 50% of the aluminum is removed from the lattice structure. In the case of talc, which contains only magnesium in the lattice, about 67% of the magnesium can be removed. It appears essential that at least two intraplanar metal atoms per unit group containing four silicon atoms be left in the lattice or else deep seated changes occur as shown by alterations in the X-ray diffraction pattern.

The other mode of treatment is to carry out the extraction to a point where the crystalline lattice structure has begun to break down. Thus, for example, between about 50% and about 90% removal of lattice aluminum (or magnesium), the X-ray diffraction pattern of the residual mineral undergoes a marked change. Coincidentally therewith, the catalytic activity of the acid treated mineral (before reprecipitating alumina, etc.) also undergoes substantial changes. Certain minerals such as montmorillonite can be treated to remove up to about 50% of the lattice metal and at that point the treated clay has approximately its maximum catalytic activity. Further removal of aluminum results in a decrease in catalytic activity of the acid treated clay.

The characteristic of catalysts produced by this invention using each of these two procedures, may vary. One may be more desirable than the other for specific purposes.

The treatment with chlorine or chlorides of carbon is carried out in any suitable type of apparatus at a temperature in the range of 300–700° C. and preferably about 450–525° C. The time of treatment varies with the amount of impurities removed and is generally of the order of 1–4 hours. The unconverted chlorine or chloride of carbon may be recycled to the process since there is only a small consumption of these agents. Any metal chlorides evolved as a result of the treatment and contained in the effluent gas should be removed before the agent is recycled. Recycled agent is considered in the total amount of agent used. In other words the process does not consume all of the agent that has passed over the particles. The actual amount consumed is that which enters into combination with metallic constituents of the clay, or is lost by handling.

The reagents may comprise carbon tetrachloride, phosgene or other low boiling aliphatic chloride of carbon such as chloroform, ethylene dichloride, trichlorethylene, propylenedichloride, propylene hexachloride, and the like. It is preferable to use a reagent which has a high ratio of combined chlorine. From a practical point of view aliphatic chlorides with 5 carbon atoms or less are used. Chlorine gas can also be used in the process. The results obtained are not exactly equivalent in all cases.

As previously stated the clay may be subjected to acid treatment as described and then after washing and drying, can be treated with the vapors of the appropriate agent.

Alternatively the acid treated clay can be formed into granules or pellets and a hydrocarbon vapor passed over them at a cracking temperature to form carbonaceous deposits typical of those formed in catalytic cracking operations. After the deposit is formed the vaporous agent may be passed over the clay at the temperature conditions and concentrations above set forth.

This operation is continued generally until the iron has been substantially removed. There is a substantial reduction in the percent carbon coating the clay and it is generally desirable to remove the remaining traces of the deposit by oxidation with a gas containing relatively low concentration of oxygen, say 1–3%, in a manner similar to that used in regenerating carbonized cracking catalyst. Chlorine is particularly effective when employing this procedure.

According to another alternative, the untreated clays and hydrocarbon vapors are subjected to cracking conditions to deposit the carbonaceous residue. Due to the relatively slight catalytic activity of the natural clay, this may require a considerably longer period of time than is the case with the acid treated clay. Care should be taken not to carry the cracking temperature to a point about about 600° C. Otherwise the subsequent acid treatment is rendered more difficult. After the deposit has been made the clay is treated with chlorine as above indicated and when the requisite amount of iron has been removed, oxygen containing gas is passed over the clay to remove the carbon. Here again the concentration of oxygen should be kept sufficiently low so that the carbon removal is carried out at a low temperature in order to avoid harming the clay and rendering its subsequent activation more difficult. The clay is then subjected to acid treatment as previously described, washed, dried and calcined at a temperature of about 300–700° C. to produce the active material.

Some of the reactions in which the catalysts may be employed are catalytic cracking of hydrocarbon oils to produce gasoline and useful gases; reforming of gasoline to improve its antiknock properties such as the susceptibility to octane improvement upon the addition of tetraethyl lead; the isomerization of olefin hydrocarbons, both to shift the double bond and to change the structure of the molecule; the polymerization of olefins; the isomerization of naphthene hydrocarbons; the dealkylation of aromatic compounds; hydrogen transfer reactions in which naphthenes and olefins are converted to aromatics and paraffins respectively without addition of elemental hydrogen; the shifting of alkyl groups around the aromatic nucleus; the hydration of olefins to produce alcohols; hydrocracking in which this catalyst is mixed with a hydrogenation catalyst such as nickel on kieselguhr, and gas-oil or other oil is cracked in the presence of hydrogen under pressures of 500–5000 pounds per square inch to produce high antiknock gasoline, and other processes.

The following examples are given to illustrate the invention but should not be construed as limiting it to the exact conditions or materials therein described.

*Example I*

Montmorillonite clay from a deposit in Nevada was treated with sulfuric acid of about 5% concentration in an amount equivalent to about 0.2 pound of anhydrous acid per pound of clay calculated on a volatile free basis. The mixture was boiled under reflux for one hour, filtered, and repeatedly washed with water until substantially free of soluble salts. This removed about 21% of the lattice aluminum, about 35% of the magnesium and some iron. No significant change in the X-ray diffraction pattern over that of the raw clay occurred. This material was dried and heated to a temperature of about 500° C. Carbon tetrachloride was passed over the clay for a period of one and a half hours at atmospheric pressure. The total amount of carbon tetrachloride was twice the weight of the clay. The iron content was reduced from about 0.94% to about 0.4%. Comparison of the thusly treated catalyst with a portion of acid treated catalyst which had not been treated with carbon tetrachloride was made in catalytic cracking test at 500° C. employing a California gas oil having a sulfur content of about 1.2%. The operation was carried out in cycles consisting of one hour cracking operation and one hour regeneration operation at a temperature of 600° C. with a flue gas containing 2% oxygen. The comparison showed that after 100 cycles the catalyst of this invention had an activity 75% of the initial activity while the catalyst without treatment with carbon tetrachloride had only 20% activity after 50 cycles.

*Example II*

The clay which had been acid treated as described in Example I was subjected to a one hour treatment with a Pennsylvania gas oil containing less than 0.1% sulfur, at 500° C. to deposit carbon thereon. At the end of one hour the supply of gas oil vapors was cut off, the tube was flushed with nitrogen to remove residual vapors, and chlorine was passed over the catalyst for a period of two hours using about 2.5 times the weight of the catalyst of chlorine vapors passed thereover.

Iron chloride was separated from the chlorine gas and it was recycled. After 2½ hours the supply of chlorine was stopped, the tube was flushed with flue gas containing 2% of oxygen for about 30 minutes at 600° C. maximum temperature to remove the remaining carbonaceous deposit and the California gas oil above referred to was passed over the catalyst in the cyclic operation as described in Example I. At the end of 100 cycles the activity of the catalyst was about 80% of the initial activity.

*Example III*

A bentonite clay was dried and subjected to the action of phosgene at a temperature of 500° C. for about 3 hours. Approximately three parts by weight of phosgene vapor was passed over the catalyst per part of clay. At the end of this treatment it was found that about 80% of the iron contained in the clay had been removed. The clay was then cooled and subjected to an acid treatment similar to that described in Example I after which it was washed, dried, formed into granules and subjected to the cracking operation as described in Example I. After 100 cycles the activity of the catalyst was about 68% of the original activity. This compares with 20% activity for the acid treated clay catalyst prepared from the same clay.

*Example IV*

The raw clay used in Example III was treated in a similar manner using hexachloroethane and treated with sulfuric acid in the manner described in Example I. After 100 cycles using the California high sulfur gas oil the activity of the catalyst was about 65% of the original.

*Example V*

The clay of the preceding examples was granulated, dried and treated with Pennsylvania low sulfur gas oil at a temperature of 480° C. for a period of five hours to deposit carbon thereon. Conversion of the gas oil was low and this was the reason for the long time of treatment. Chlorine gas was passed over the clay after purging the hydrocarbon vapors, at a temperature of 500° C. until the iron content had been reduced by about 80%. The clay was cooled and removed from the treating tube. It was ground and treated with acid as previously described, washed, dried, formed into pellets and calcined at 600° C.

The activity of this catalyst after 100 cycles was about 73% of the initial activity.

These examples illustrate various methods of treating the clay and show that the activity of the catalysts thus produced can be maintained for long periods of time while the acid treated clay not subjected to the treatment of this invention loses its activity quickly and to a much greater extent.

I claim as my invention:

1. A process for producing a cracking catalyst having long catalytic life comprising the steps of passing hydrocarbon vapors at a cracking temperature over a lattice layer type body selected from the group consisting of a raw lattice type clay and an acid treated lattice type clay to deposit carbon thereon, then subjecting the carbonized body to the action of a chlorine substance selected from the group consisting of chlorine gas and the vaporizable chlorides of carbon at a temperature of 300° to 700° C., and then burning off the remaining carbon, and, when said raw clay is so treated, the further step of acid treating it after burning off the carbon.

2. A process for producing a cracking catalyst having long catalytic life comprising the steps of passing hydrocarbon vapors at a cracking temperature over a lattice layer type body selected from the group consisting of a raw lattice type clay and an acid treated lattice type clay to deposit carbon thereon, then subjecting the carbonized body to the action of a chlorine substance selected from the group consisting of chlorine gas and the vaporizable chlorides of carbon at a temperature of 450° to 700° C., and then burning off the remaining carbon, and, when said raw clay is so treated, the further step of acid treating it after burning off the carbon.

3. The process of claim 2 wherein the body is a raw clay, and comprising the additional step of acid treating the clay after the treatment to remove carbon.

4. The process of claim 2 wherein the body is bentonite.

5. The process of claim 2 wherein the body is montmorillonite.

6. The process of claim 2 wherein the body is selected from the kaolin group.

7. The process of claim 2 wherein the body is kaolinite.

8. The process of claim 2 wherein the body is an acid treated clay.

CHARLES L. THOMAS.

REFERENCES CITED

The following references are of record in the file of this patent:

UNITED STATES PATENTS

| Number | Name | Date |
| --- | --- | --- |
| 2,300,878 | Drennan et al. | Nov. 3, 1942 |
| 2,322,674 | Thomas | June 22, 1943 |
| 2,388,735 | Gary et al. | Nov. 13, 1945 |
| 2,395,198 | Schulze | Feb. 19, 1946 |
| 2,466,046 | Shabaker et al. | Apr. 5, 1949 |
| 2,466,047 | Shabaker et al. | Apr. 5, 1949 |
| 2,466,048 | Shabaker et al. | Apr. 5, 1949 |